United States Patent
Hough (10) Patent No.: US 8,172,428 B2
(45) Date of Patent: May 8, 2012

(54) OPTICAL SYSTEM WITH NON-CIRCULAR APERTURE

(75) Inventor: Thomas A. Hough, Tucson, AZ (US)

(73) Assignee: Whiterock Design, LLC, Tucson, AZ (US)

( * ) Notice: Subject to any disclaimer, the term of this patent is extended or adjusted under 35 U.S.C. 154(b) by 332 days.

(21) Appl. No.: 11/807,212

(22) Filed: May 25, 2007

(65) Prior Publication Data

US 2008/0002409 A1 Jan. 3, 2008

Related U.S. Application Data

(60) Provisional application No. 60/808,604, filed on May 26, 2006.

(51) Int. Cl.
*F21S 8/00* (2006.01)

(52) U.S. Cl. ........ 362/268; 362/281; 362/293; 362/321; 362/331

(58) Field of Classification Search .................. 362/268, 362/281, 293, 321, 331, 355

See application file for complete search history.

(56) References Cited

U.S. PATENT DOCUMENTS

| | | | |
|---|---|---|---|
| 4,745,531 A * | 5/1988 | Leclercq | 362/281 |
| 5,274,480 A | 12/1993 | Hirai et al. | |
| 5,371,655 A * | 12/1994 | Murdock et al. | 362/18 |
| 5,442,414 A | 8/1995 | Janssen et al. | |
| 6,538,827 B2 | 3/2003 | Bos | |
| 6,796,682 B2 * | 9/2004 | Hough et al. | 362/268 |
| 6,939,009 B2 * | 9/2005 | Fischer et al. | 353/43 |
| 2003/0202259 A1 | 10/2003 | Nishimae et al. | |
| 2005/0140933 A1 | 6/2005 | Cannon et al. | |
| 2005/0151939 A1 | 7/2005 | English, Jr. et al. | |
| 2006/0007686 A1 | 1/2006 | Hough | |

* cited by examiner

*Primary Examiner* — Jason Moon Han (57) ABSTRACT

An optical system, light fixture and method are provided that include a light source, a non-circular aperture, a filter apparatus, and a lens. The light source produces a first beam of light, a portion of which is passed by the non-circular aperture. The filter apparatus is positioned proximate to the non-circular aperture and is operable to selectively position a desired portion of a variable density filter in the portion of the first beam of light passed by the non-circular aperture. The lens collects the portion of the first beam of light passed by the non-circular aperture to produce a second beam of light.

18 Claims, 6 Drawing Sheets

OPTICAL SYSTEM WITH NON-CIRCULAR APERTURE

CROSS-REFERENCE TO RELATED APPLICATIONS

This application claims priority under 35 U.S.C. §119(e) to U.S. Provisional Application No. 60/808,604, filed on May 26, 2006, which is hereby incorporated by reference as if reproduced herein in its entirety.

TECHNICAL FIELD

The present invention relates generally to optical systems and more particularly to an optical system having a non-circular aperture.

BACKGROUND

Lighting fixtures typically include a light source that produces a beam of light. The light source may be an illumination source, for example a lamp or bulb, that emits light in many directions, coupled with a reflector that redirects light emitted in an undesired direction into a desired direction. A light source may also be an illumination source that inherently emits light in a desired direction, for example a light emitting diode (LED). A light source may also be an array of illumination sources that inherently emit light in a desired direction, where the illumination sources are arranged to emit light in substantially the same direction or angular range.

A lighting fixture may have a simple illumination optical system that includes only a light source or it may have a more complex illumination optical system that may also include one or more lenses, irises, pattern generators, color filters or other optical elements. Such a complex illumination optical system may provide control of the size, shape, color, contour, pattern, brightness, and other characteristics of the light beam produced by the lighting fixture.

Where a light beam has a size greater than an optical element that is intended to control a characteristic of the beam, an aperture may be used to block portions of the beam. For example, where a circular beam has a diameter larger than the diameter of a lens, an aperture may be used to prevent portions of the beam from traveling past the edges of the lens. Similarly, where a light beam has a size greater than a filtering element, an aperture may be used to prevent portions of the beam from passing the outer edges of the filter. Such unfiltered light could mix with the filtered light, producing a beam having a characteristic different from that of the filter material.

A projection optical system is an imaging system. An imaging system provides a point to point mapping of light from one region of space to another. For example, where the object of an imaging optical system is a digital micromirror device, the optical system is designed to map the light from each pixel to a particular region in the image plane. The order and relative positions of the pixels are preserved in the image plane.

A wash optical system is a non-imaging optical system. A non-imaging optical system conveys light from one region to another, but image formation is not the goal. The designer of a non-imaging optical system is often only concerned with the boundaries of the light emitting and target regions. For example, a non-imaging optical system may map a cylinder of light into a rectangular pattern, as in a car headlamp. An image of the filament structure is not desired, but rather a uniform smear of light. By relaxing the imaging condition, a non-imaging optical system may be designed to be more efficient than an imaging optical system.

The cost of an optical element is typically proportional to its size, with the result that a small aperture is used to prevent a larger light beam from passing around an element made small to reduce its cost. However, a small aperture reduces the energy in the beam by blocking off a portion of the beam. Rather than using an aperture, the size of the beam could be reduced with one or more lenses prior to the beam arriving at the small optical element, but the addition of lenses to an optical system typically increases its length, weight, and cost. Additionally, such lenses can increase the maximum angle of the beam, causing optical aberrations or losses downstream.

The present invention was principally motivated by a desire to address the above-identified issues. However, the invention is in no way so limited, and is only to be limited by the accompanying claims as literally worded and appropriately interpreted in accordance with the Doctrine of Equivalents.

SUMMARY

Aspects of the invention may be found in an illumination optical system that includes a light source, a non-circular aperture, a filter apparatus, and a lens. The light source produces a first beam of light, a portion of which is passed by the non-circular aperture. The filter apparatus is positioned proximate to the non-circular aperture and is operable to selectively position a desired portion of a variable density filter in the portion of the first beam of light passed by the non-circular aperture. The lens collects the portion of the first beam of light passed by the non-circular aperture to produce a second beam of light.

Other aspects of the invention may be found in a light fixture that includes a housing, a light source, a non-circular aperture, a filter apparatus, and a lens. The light source produces a first beam of light, a portion of which is passed by the non-circular aperture, which is located in the housing. The filter apparatus is positioned proximate to the non-circular aperture and is operable to selectively position a desired portion of a variable density filter in the portion of the first beam of light passed by the non-circular aperture. The lens collects the portion of the first beam of light passed by the non-circular aperture to produce a second beam of light.

Still other aspects of the invention may be found in a method that includes providing a light source that is operable to produce a first beam of light. The method also includes positioning a non-circular aperture to pass a portion of the first beam of light. The method further includes positioning a filter apparatus comprising a variable density filter in a portion of the first beam of light passed by the non-circular aperture. The method also includes configuring a lens to collect the portion of the first beam of light passed by the non-circular aperture and produce a second beam of light.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION

The readers of this document should understand that the embodiments described herein may rely on terminology used in any section of this document and other terms not readily apparent from the drawings and language common therefore. This document is premised upon using one or more terms with one embodiment that may also apply to other embodiments for similar structures, functions, features and aspects of the invention. Wording used in the claims is also descriptive of the invention and the text of the claims is incorporated by reference into the description entirely in the form of the claims as originally filed. Terminology used with one, some or all embodiments may be used for describing and defining the technology and exclusive rights associated herewith.

Figure 1:
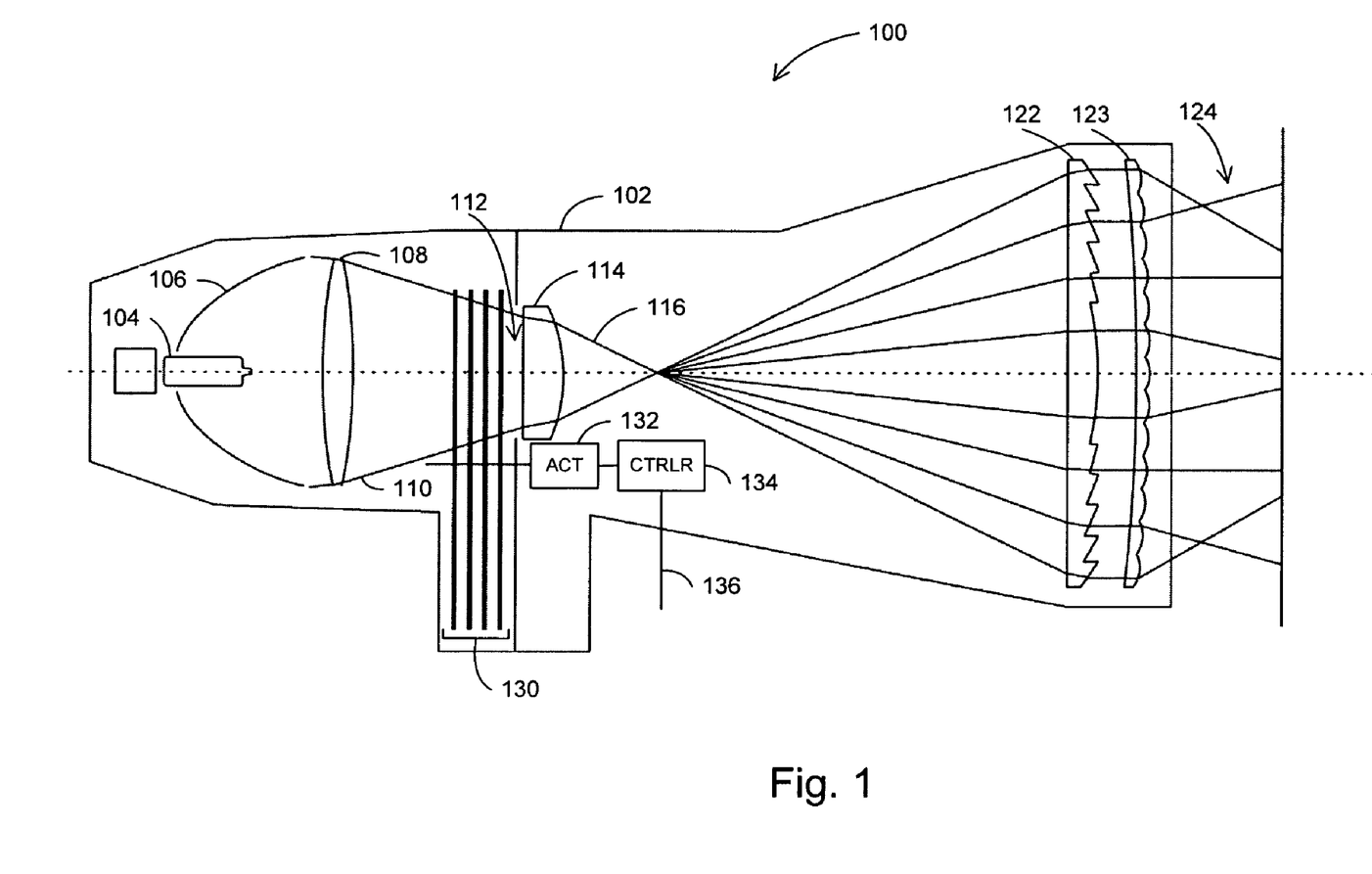
FIG. 1 is a schematic diagram of a wash light fixture including a non-circular aperture according to the present invention.

FIG. 1 is a schematic diagram of a wash light fixture 100 including a non-circular aperture 112 according to the present invention. The wash light fixture 100 comprises a wash optical system that produces a soft-edged beam of light. Additional details of wash optical systems may be found in U.S. patent application Ser. No. 11/347,457, filed Feb. 3, 2006, entitled "OPTICAL SYSTEM FOR A WASH LIGHT," which is hereby incorporated by reference as if reproduced herein in its entirety. The light fixture 100 includes a housing 102. Within the housing are a lamp 104 and a reflector 106, which form a light source emitting a beam of light. The light beam emitted by the light source may be collected by a lens 108 to form a light beam 110.

The light beam 110 passes through a filter apparatus 130, which may control one or more characteristics of the light beam 110. Such characteristics may include color or brightness. The light beam 110 also passes through the non-circular aperture 112. The aperture 112 passes a portion of the light beam 110 and blocks another portion of the beam 110. The portion of the light beam 110 passed by the aperture 112 may be collected by a lens 114 to form a light beam 116. The light beam 116 passes through a non-imaging lens 122, which does not form a well defined image of any element of the optical system of the light fixture 100. The light beam 116 may further pass through a beam shaping device 123, to form a light beam 124 projected by the wash light fixture 100.

The filter apparatus 130 is positioned proximate to the non-circular aperture 112 and may comprise one or more variable density filters coupled to actuators 132 to allow desired portions of the filters to be positioned in the light beam 110. The filter apparatus 130 may include a controller 134 having a control input 136 and capable of operating the actuators 132. The controller 134 may operate the actuators 132 to selectively position the one or more filters with desired portions of the filters in the light beam 110, according to a signal received on the control input 136. The filters of the filter apparatus 130 may include a dimming filter and one or more color filters.

It will be understood that in other embodiments of the invention, other optical systems using a non-circular aperture may be employed in a wash light fixture without departing from the scope of the present invention. In some embodiments, the lens 114 may be a plano-concave lens. In other embodiments, the lens 114 may be a lens group with positive or negative optical power. In still other embodiments, the reflector 106 may be designed so that the lens 108 is not required.

While the non-imaging lens 122 is shown in FIG. 1 as a Fresnel lens, in another embodiment of the invention the non-imaging lens 122 may be a plano-convex lens. In still another embodiment, lenses 122 and 123 may be combined into a single double sided element. In yet another embodiment, lenses 122 and 123 may be replaced by a fiber optic or fiber optic bundle to convey the filtered light beam to a remote location.

Figure 2:
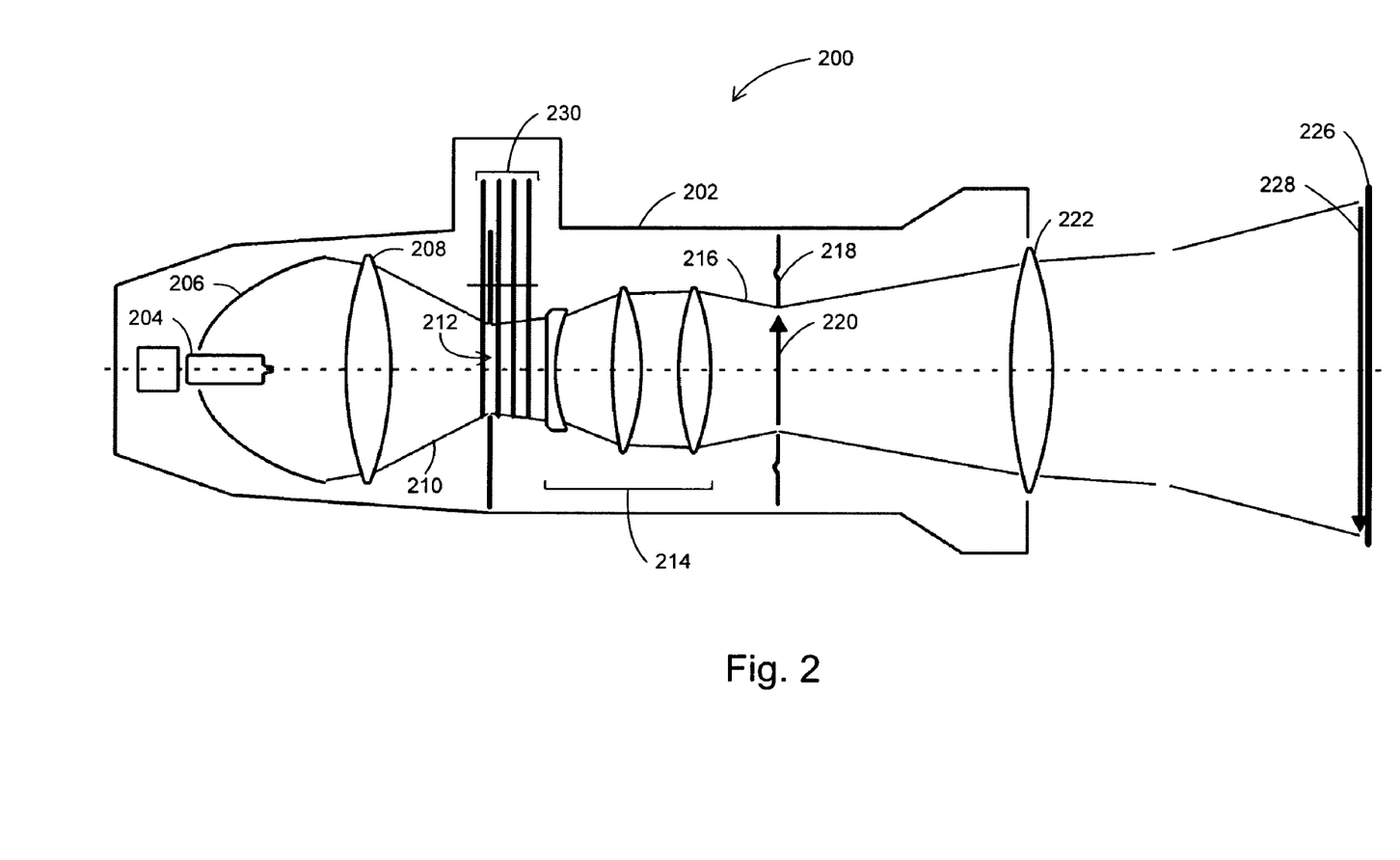
FIG. 2 is a schematic diagram of a projection light fixture including a non-circular aperture according to the present invention.

FIG. 2 is a schematic diagram of a projection light fixture 200 including a non-circular aperture 212 according to the present invention. The projection light fixture 200 comprises a projection optical system. Additional details of projection optical systems may be found in U.S. patent application Ser. No. 10/992,802, filed Nov. 19, 2004, entitled "STAGE LIGHTING METHODS AND APPARATUS," which is hereby incorporated by reference as if reproduced herein in its entirety. The light fixture 200 includes a housing 202. Within the housing are a lamp 204 and a reflector 206, which form a light source emitting a beam of light. The light beam emitted by the light source may be collected by a lens 208 to form a light beam 210.

The light beam 210 passes through a filter apparatus 230 including one or more variable density filters, which may control one or more characteristics of the light beam 210. A portion of the light beam 210 passes through the non-circular aperture 212. Another portion of the beam 210 is blocked by the aperture 212. It may be seen in FIG. 2 that the filter apparatus 230 may include filters located on both sides of the aperture 212. As described for the filter apparatus 130 of FIG. 1, the filter apparatus 230 is positioned proximate to the non-circular aperture 112 and may include actuators and a controller with a control input (not shown in FIG. 2), the controller operable to selectively position desired portions of the filters of the filter apparatus 230 in the light beam 210.

The portion of the light beam 210 passing through the filter apparatus 230 and the non-circular aperture 212 may be collected by a relay lens group 214 to form a light beam 216 that illuminates a projection gate 218. The projection gate 218 may include a pattern generator 220. An image 228 of the projection gate 218 and, if present, the pattern generator 220 may be projected on projection surface 226 by a projection lens 222.

It will be understood that a lens group may include any number of lenses arranged in any sequence of lenses that produces a desired effect in a beam of light passing through the lens group. A lens group may include only a single lens.

Other embodiments of the invention, other optical systems using a non-circular aperture may be employed in a projection light fixture without departing from the scope of the present invention. In some embodiments, the lenses in the lens relay group 214 may be arranged in a different sequence of positive and negative lenses. In still other embodiments, the projection lens 222 may comprise a projection lens group. Such a projection lens group may comprise a zoom lens consisting of a number of moving lens groups.

While FIGS. 1 and 2 depict a light source comprising a lamp and reflector that produce a light beam, it will be understood that another embodiment of the invention may utilize a light source comprising an LED, an electrodeless lamp, or an array of light sources such as LEDs, electrodeless lamps, or optical fibers.

Figure 3:
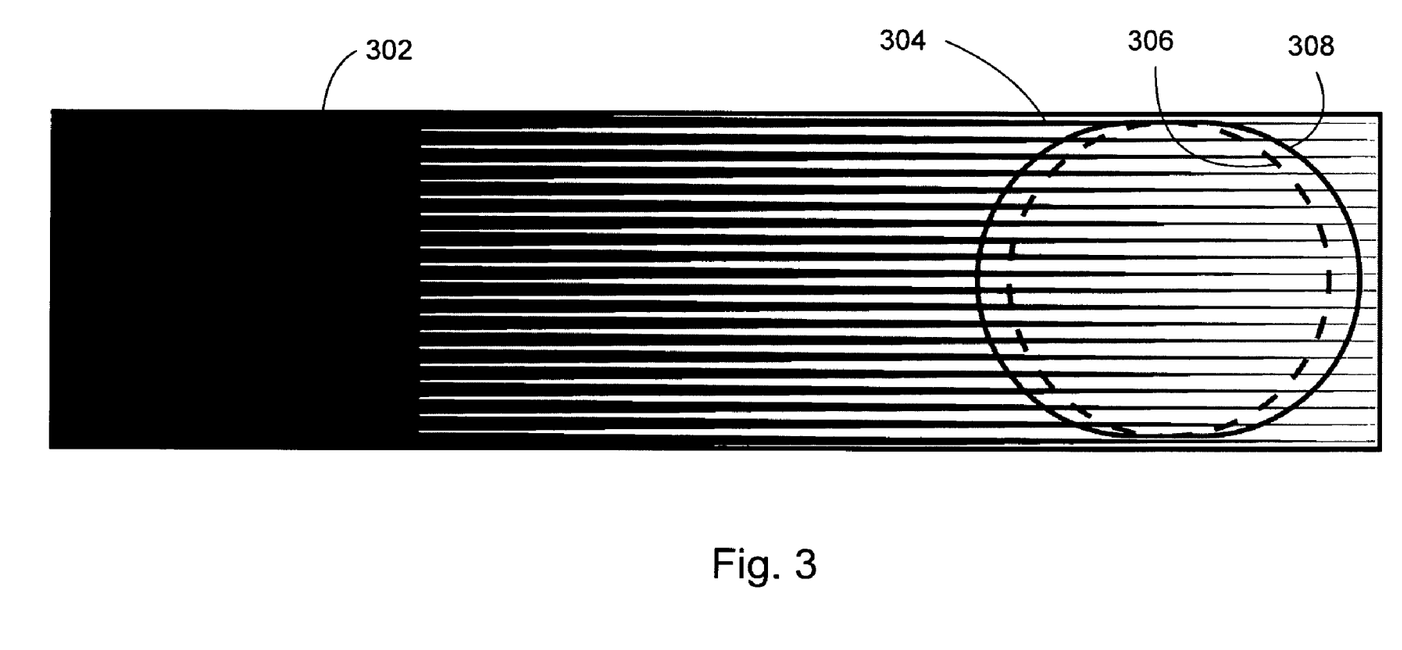
FIG. 3 is a schematic diagram of a variable density filter plate and a non-circular aperture according to the present invention.

FIG. 3 is a schematic diagram of a variable density filter plate 302 and a non-circular aperture 308 according to the present invention. The filter plate 302 may be utilized in a filter apparatus to control the color or energy content of the light beam produced by a light fixture.

The filter plate 302 is typically a clear substrate overlaid by a patterned filter material 304. The white regions of the plate 302 represent the clear substrate and the dark regions represent the filter material 304. The filter material 304 on plate 302 has a pattern of fingers that thicken from one end of the plate to the other, ending in a region where the optical material completely covers the plate 302. In other embodiments of the invention, there may be no region of the filter plate 302 where the filter material 304 completely covers the plate 302.

Where control of the energy content of a light beam is desired, the filter material 304 may be a reflective coating that prevents light from passing through the filter plate 302. Where control of the color of a light beam is desired, the filter material 304 may be a color filter, such that light passing through the filter material 304 has a color determined by the original color of the light beam and the color of the filter material 304, while light passing through only the clear substrate has a color determined only by the original color of the light beam. The color of the resulting light beam is determined by the ratio of the light that passes through the filter material 304 and the unfiltered portion of the plate 302.

Where a beam of light passing through the filter plate 302 is larger than the plate 302, the plate 302 is typically located next to a circular aperture 306 that blocks a portion of a light beam that would otherwise pass unfiltered above or below the filter plate 302. A filter apparatus in which the filter plate 302 is used typically includes an actuator to move the plate 302 across the aperture 306. In this way a desired portion of the filter material 304 may be positioned in the beam of light passing through the aperture 306 in order to provide a desired amount of filtration to the beam of light. The plate 302 may be positioned partially or completely outside the aperture 306, thereby positioning a desired portion of the plate 302 in the beam of light and allowing a desired amount of unfiltered light to pass.

The non-circular aperture 308 may be used with the filter plate 302 to increase the portion of a light beam that passes through the filter plate 302. It may be seen from FIG. 3 that the height of the non-circular aperture 308 is the same as the height of the circular aperture 306, in order to prevent light from passing unfiltered above or below the filter plate 302. However, the sides of the non-circular aperture 308 extend farther than the sides of the circular aperture 306, in order to pass light that would be blocked by the circular aperture 306, as is shown and described with reference to FIG. 6.

If greater throughput, or light output, were desired from an optical system that uses the circular aperture 306, a larger circular aperture and accordingly larger filter plate 302 would be required. Such changes would likely increase the cost and size of the optical system. In contrast, an optical system utilizing the non-circular aperture 308 has greater throughput without increasing the size of the filter plate 302 or the cost of the optical system.

While the non-circular aperture 308 is shown in use with a filter plate having a pattern of fingers, it will be understood that in other embodiments of the invention, a non-circular aperture may be used with a filter plate having a different pattern that provides regions producing differing amounts of filtration. In other embodiments, a non-circular aperture may be used with a filter plate having regions that produce differing types of filtration, for example regions of differing colors.

Figure 4:
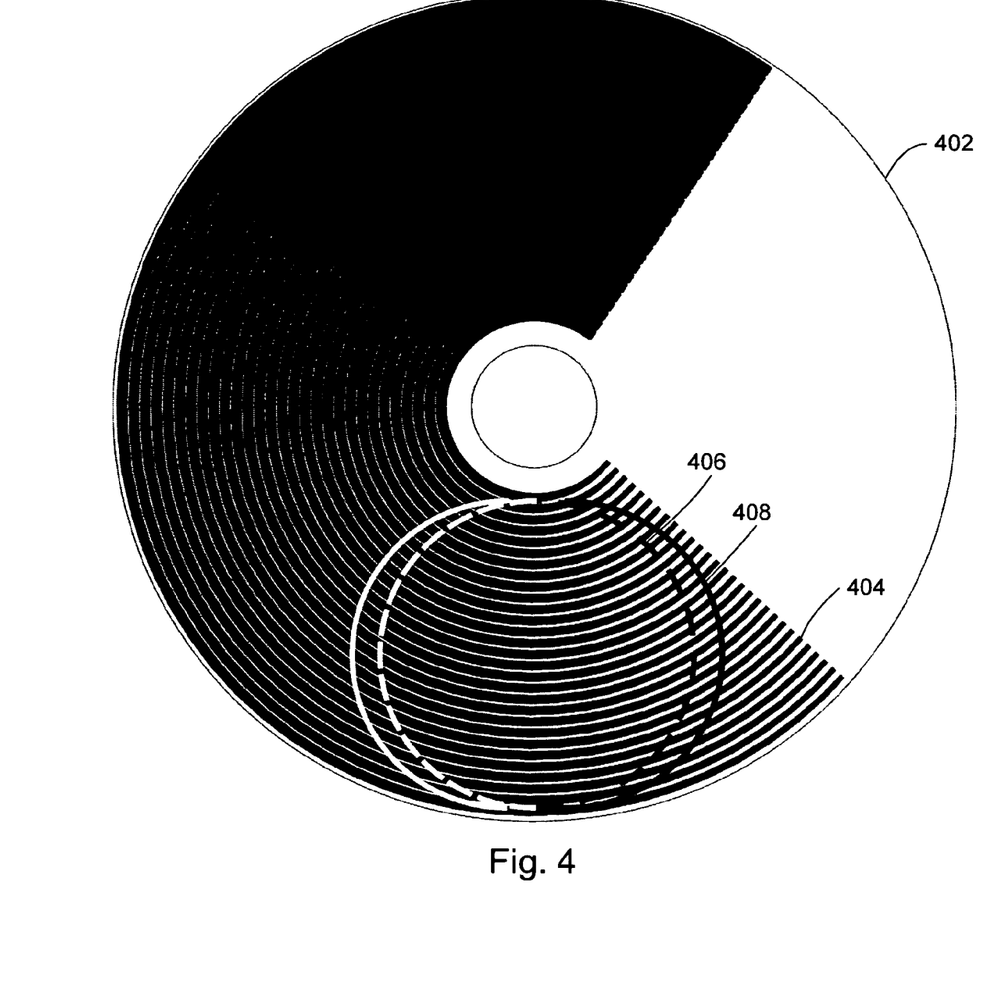
FIG. 4 is a schematic diagram of a variable density filter wheel and a non-circular aperture according to the present invention.

FIG. 4 is a schematic diagram of a variable density filter wheel 402 and a non-circular aperture 408 according to the present invention. Similar to the filter plate 302, the filter wheel 402 comprises a clear substrate overlaid by a patterned filter material 404.

Where a beam of light passing through the filter wheel 402 is larger than the radial extent of the pattern 404 on the wheel 402, the wheel 402 is typically used in conjunction with a circular aperture 406 that blocks the portion of a light beam that would otherwise pass unfiltered near the hub, or outside the circumference of the wheel 402. A filter apparatus in which the filter wheel 402 is used typically includes an actuator to rotate the wheel 402 across the circular aperture 406. In this way a desired portion of the wheel 402 may be positioned in the beam of light passing through the circular aperture 406 in order to provide a desired amount of filtration to the beam of light. The wheel 402 may be rotated to a completely clear section to allow unfiltered light to pass.

The non-circular aperture 408 may be used with the filter wheel 402 to increase the portion of a light beam that passes through the filter wheel 402. It may be seen from FIG. 4 that the height of the non-circular aperture 408 is the same as the height of the circular aperture 406, in order to prevent light from passing unfiltered near the hub, or outside the circumference of the wheel 402. As with the non-circular aperture 308, the sides of the non-circular aperture 408 extend farther than the sides of the circular aperture 406, in order to pass light that would be blocked by the circular aperture 406.

As with the filter plate 302 and circular aperture 306 of FIG. 3, if greater throughput were desired from an optical system using the circular aperture 406, a larger aperture and accordingly larger and more costly filter wheel 402 would be required. In contrast, an optical system utilizing the non-circular aperture 408 has greater throughput without increasing the size of the filter plate 402 or the cost of the optical system.

While the non-circular aperture 408 is shown in use with a filter wheel 402 having a pattern of fingers, it will be understood that in other embodiments of the invention, a non-circular aperture may be used with a filter wheel having a different pattern that provides regions producing differing amounts of filtration. In still other embodiments, a non-circular aperture may be used with a filter wheel having regions that produce differing types of filtration, for example regions of differing colors.

Figure 5:
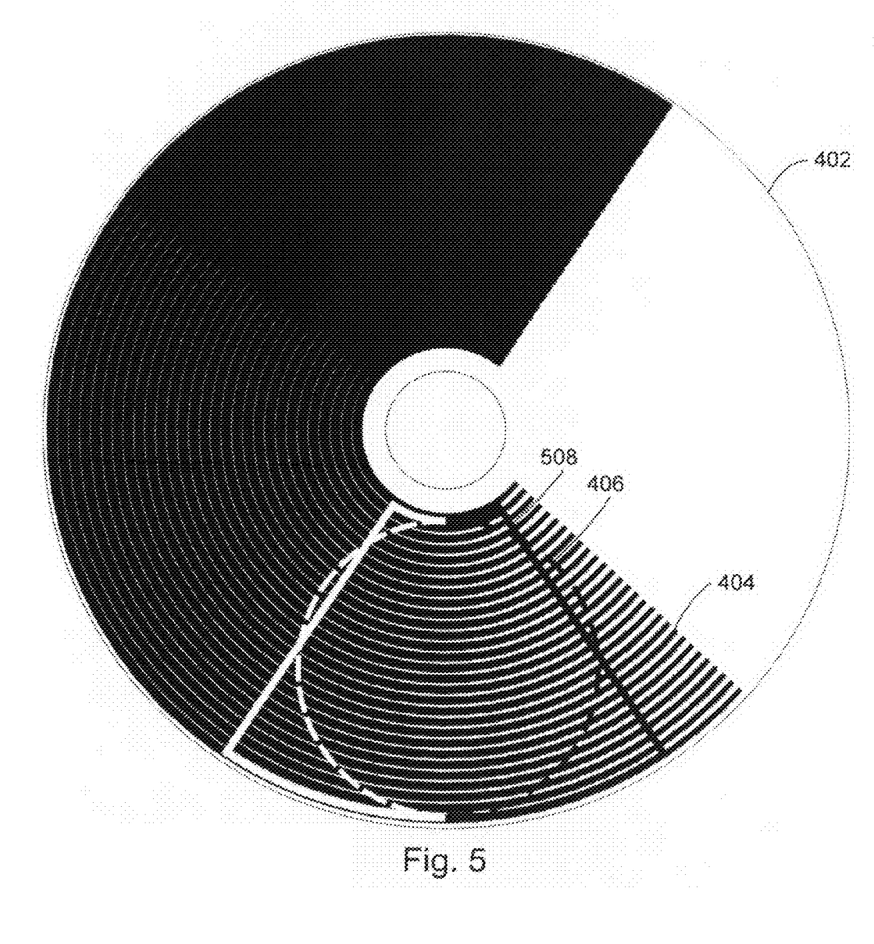
FIG. 5 is a schematic diagram of a variable density filter wheel and a non-circular aperture according to the present invention.

FIG. 5 is a schematic diagram of the variable density filter wheel 402 and a second non-circular aperture 508 according to the present invention. The fingers of the patterned filter material 404 sweep out concentric circles centered on the center of the filter wheel 402. The thickness of the fingers varies with increasing angle around the wheel. In one embodiment, the finger thickness is constant for a particular angle around the wheel. As a result, the sections of fingers that subtend a given angle of the filter wheel 402 provide the same range of filtration. For this reason, the sides of the non-circular aperture 508 are defined by radii of the filter wheel 402 and the inner and outer edges are aligned with the inner and outer borders of the patterned filter material 404. As a result, the non-circular aperture 508 allows light to pass through all the areas of the filter wheel 402 that provide a desired range of filtration.

It will be understood that in other embodiments of the invention an optical system may employ other shapes of non-circular apertures than the generally oval apertures shown in FIGS. 3 and 4 and the generally trapezoidal aperture shown in FIG. 5.

Figure 6:
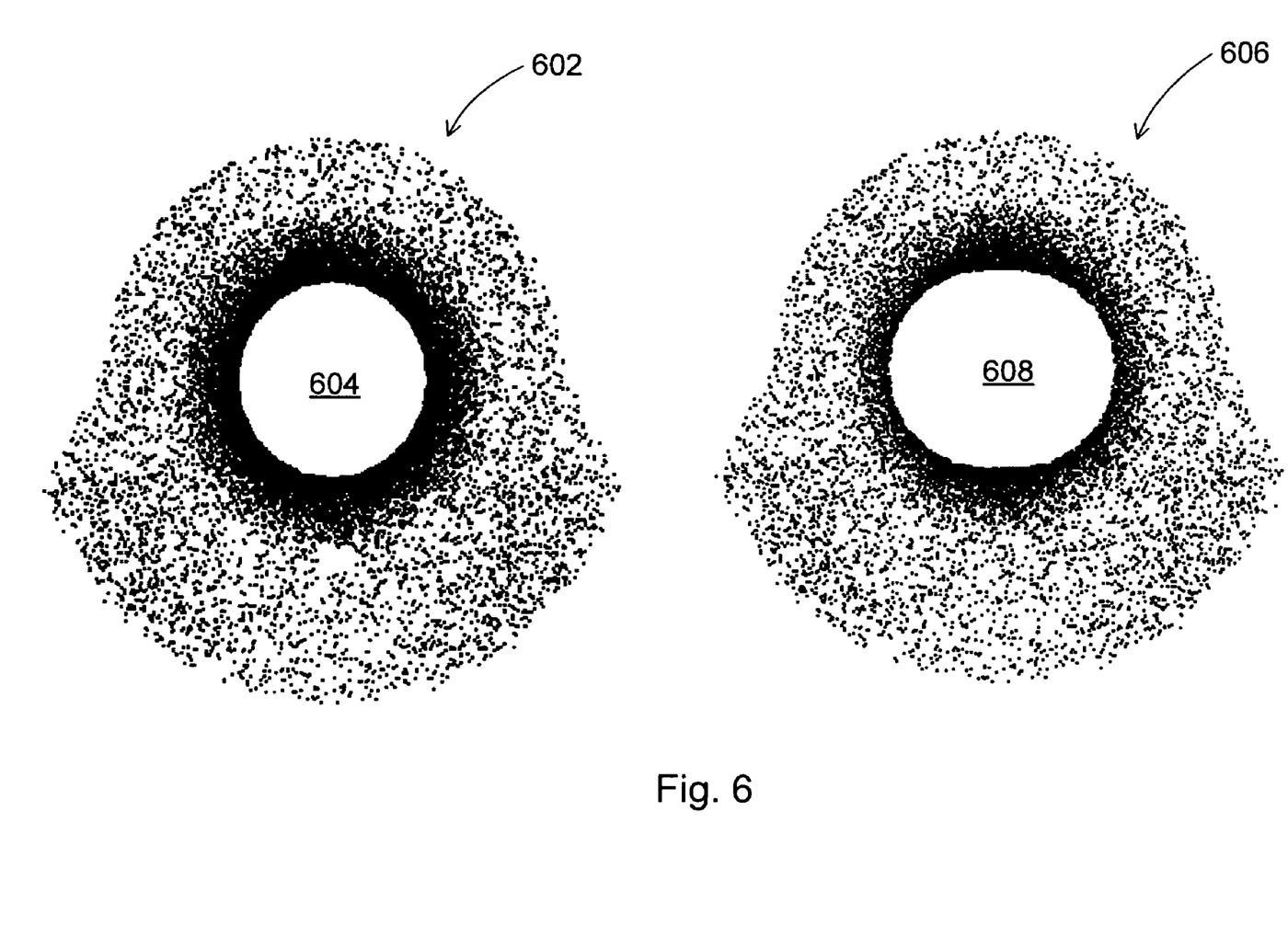
FIG. 6 presents ray spot diagrams of light rays blocked by a circular aperture and a non-circular aperture.

FIG. 6 presents ray spot diagrams 602 and 606 of light rays blocked by a circular aperture 604 and a non-circular aperture 608. The spots in the ray spot diagrams represent light rays of a light beam that are blocked by the opaque material surrounding an aperture. A greater density of spots indicates a greater irradiance of light in that portion of the beam. Irradiance is defined as power per unit area.

As may be seen in the ray spot diagram 602, there are rays in the portion of the beam immediately surrounding the circular aperture 604 that are blocked by the opaque material in which the aperture 604 is formed. As shown in the ray spot diagram 606, the non-circular aperture 608 allows some of those rays to pass, while still blocking the rays above and below the aperture that would travel unfiltered past the filter plate 302 or filter wheel 402.

Although the contour of the non-circular aperture 608 appears to depart only slightly from the contour of the circular aperture 604, the resulting increase in light throughput is significant. In the light beam and apertures models shown in the ray spot diagrams 602 and 606, the circular aperture 604 blocks 3976 lumens, while the non-circular aperture 608 blocks 2240 lumens. The area of the non-circular aperture 608 is 20% greater than that of the circular aperture 604, but the non-circular aperture 608 blocks 44% less light than that blocked by the circular aperture 604.

It may be advantageous to set forth definitions of certain words and phrases used throughout this patent document. The term "couple" and its derivatives refer to any direct or indirect communication between two or more elements, whether or not those elements are in physical contact with one another. The terms "application" and "program" refer to one or more computer programs, software components, sets of instructions, procedures, functions, objects, classes, instances, related data, or a portion thereof adapted for implementation in a suitable computer code (including source code, object code, or executable code). The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system, or part thereof that controls at least one operation. A controller may be implemented in hardware, firmware, software, or some combination of at least two of the same. The functionality associated with any particular controller may be centralized or distributed, whether locally or remotely.

Although specific embodiments of the present invention are disclosed, these are not to be construed as limiting the scope of the present invention. Many variants of the invention will become apparent to those skilled in the art in light of this specification. The scope of the invention is only limited by the claims appended hereto.

What is claimed is:

1. An illumination optical system, comprising:
a light source configured to produce a first beam of light;
a non-circular aperture configured to pass a portion of the first beam of light;
a filter apparatus positioned proximate to the non-circular aperture and operable to selectively position a desired portion of a variable density filter in the portion of the first beam of light passed by the non-circular aperture; and
a lens group configured to collect substantially all of the portion of the first beam of light passed by the non-circular aperture to produce a second beam of light utilizing substantially all of the portion of the first beam of light, wherein the second beam of light has a circular cross-section,
wherein the optical system comprises a non-imaging optical system.

2. The optical system of claim 1, wherein the filter apparatus is operable to position a plurality of variable density filters in the portion of the first beam of light passed by the non-circular aperture.

3. The optical system of claim 1, wherein the filter apparatus comprises a mechanism having an input and operable to:
receive a signal on the input; and
selectively position a desired portion of the variable density filter in the portion of the first beam of light passed by the non-circular aperture in response to the received signal.

4. The optical system of claim 1, wherein the variable density filter is one of a patterned color filter and a patterned dimming filter.

5. A light fixture, comprising:
a housing;
a light source configured to produce a first beam of light;
a non-circular aperture located in the housing and configured to pass a portion of the first beam of light;
a filter apparatus positioned proximate to the non-circular aperture and operable to selectively position a desired portion of a variable density filter in the portion of the first beam of light passed by the non-circular aperture; and
a lens group configured to collect substantially all of the portion of the first beam of light passed by the non-circular aperture and produce a second beam of light utilizing substantially all of the portion of the first beam of light, wherein the second beam of light has a circular cross-section;
a projection gate, wherein the portion of the first beam of light passed by the non-circular aperture illuminates the projection gate; and
a projection lens configured to project an image of the projection gate.

6. The light fixture of claim 5, wherein the filter apparatus is operable to position a plurality of variable density filters in the portion of the first beam of light passed by the non-circular aperture.

7. The light fixture of claim 5, wherein the filter apparatus comprises a mechanism having an input and operable to:
receive a signal on the input; and
selectively position a desired portion of the variable density filter in the portion of the first beam of light passed by the non-circular aperture in response to the received signal.

8. The light fixture of claim 5, wherein the lens group is disposed between the non-circular aperture and the projection gate.

9. The light fixture of claim 5, wherein the variable density filter is one of a patterned color filter and a patterned dimming filter.

10. A method, comprising:
providing a light source operable to produce a first beam of light;
positioning a non-circular aperture to pass a portion of the first beam of light;
positioning a filter apparatus comprising a variable density filter in the portion of the first beam of light passed by the non-circular aperture; and
configuring a lens group to collect substantially all of the portion of the first beam of light passed by the non-circular aperture and produce a second beam of light utilizing substantially all of the portion of the first beam of light, wherein the second beam of light has a circular cross-section, and wherein the lens group is a non-imaging lens group.

11. The method of claim 10, wherein the filter apparatus comprises a plurality of variable density filters.

12. The method of claim 10, wherein positioning a filter apparatus comprises:
receiving a signal; and
selectively positioning a desired portion of the variable density filter in the portion of the first beam of light passed by the non-circular aperture in response to the received signal.

13. The method of claim 10, wherein the variable density filter is one of a patterned color filter and a patterned dimming filter.

14. A projection optical system, comprising:
a light source operable to produce a first beam of light;
a non-circular aperture configured to pass a portion of the first beam of light;
a filter apparatus positioned proximate to the non-circular aperture and operable to selectively position a desired portion of a variable density filter in the portion of the first beam of light passed by the non-circular aperture;
a relay lens group configured to collect substantially all of the portion of the first beam of light passed by the non-circular aperture to produce a second beam of light utilizing substantially all of the portion of the first beam of light, wherein the second beam of light has a circular cross-section
a projection gate; and
a projection lens configured to project an image of the projection gate.

15. The projection optical system of claim 14, wherein the filter apparatus is operable to position a plurality of variable density filters in the portion of the first beam of light passed by the non-circular aperture.

16. The projection optical system of claim 14, wherein the filter apparatus comprises a mechanism having an input and operable to:
receive a signal on the input; and
selectively position a desired portion of the variable density filter in the portion of the first beam of light passed by the non-circular aperture in response to the received signal.

17. The projection optical system of claim 14, wherein the relay lens group is disposed between the non-circular aperture and the projection gate.

18. The projection optical system of claim 14, wherein the variable density filter is one of a patterned color filter and a patterned dimming filter.

* * * * *